United States Patent
Marks

[15] 3,666,297
[45] May 30, 1972

[54] TUBE CONNECTOR FITTING
[72] Inventor: Murray Marks, Los Angeles, Calif.
[73] Assignee: The United States of America as represented by the Secretary of the Interior
[22] Filed: Apr. 22, 1971
[21] Appl. No.: 136,438

[52] U.S. Cl..............................285/81, 285/323, 285/356, 285/DIG. 16, 285/DIG. 22, 285/382.4
[51] Int. Cl............................................F16l 17/06
[58] Field of Search............285/356, 250, DIG. 22, DIG. 16, 285/81, 323, 322, 382.4, 319, 421

[56] References Cited

UNITED STATES PATENTS

| | | | |
|---|---|---|---|
| 1,474,435 | 11/1923 | McWane | 285/356 X |
| 2,236,967 | 4/1941 | Couty | 285/356 X |
| 2,416,618 | 2/1947 | Ferla | 285/356 X |
| 3,387,865 | 6/1968 | Ross | 285/322 X |
| 3,560,026 | 2/1971 | Roe | 285/322 X |

FOREIGN PATENTS OR APPLICATIONS

| | | | |
|---|---|---|---|
| 1,310,713 | 10/1962 | France | 285/322 |
| 1,072,028 | 12/1959 | Germany | 285/250 |

*Primary Examiner*—Thomas F. Callaghan
*Attorney*—Ernest S. Cohen and Albert A. Kashinski

[57] ABSTRACT

A fitting for interconnecting a tube and a fluid distribution header. O-ring and elastomeric seals prevent internal and external leakage. In one embodiment threaded connections are employed. In another embodiment concentric interlocking ridges and grooves are used.

10 Claims, 4 Drawing Figures

INVENTOR
MURRAY MARKS
BY Ernest S. Cohen
Albert C. Kashinski
ATTORNEYS

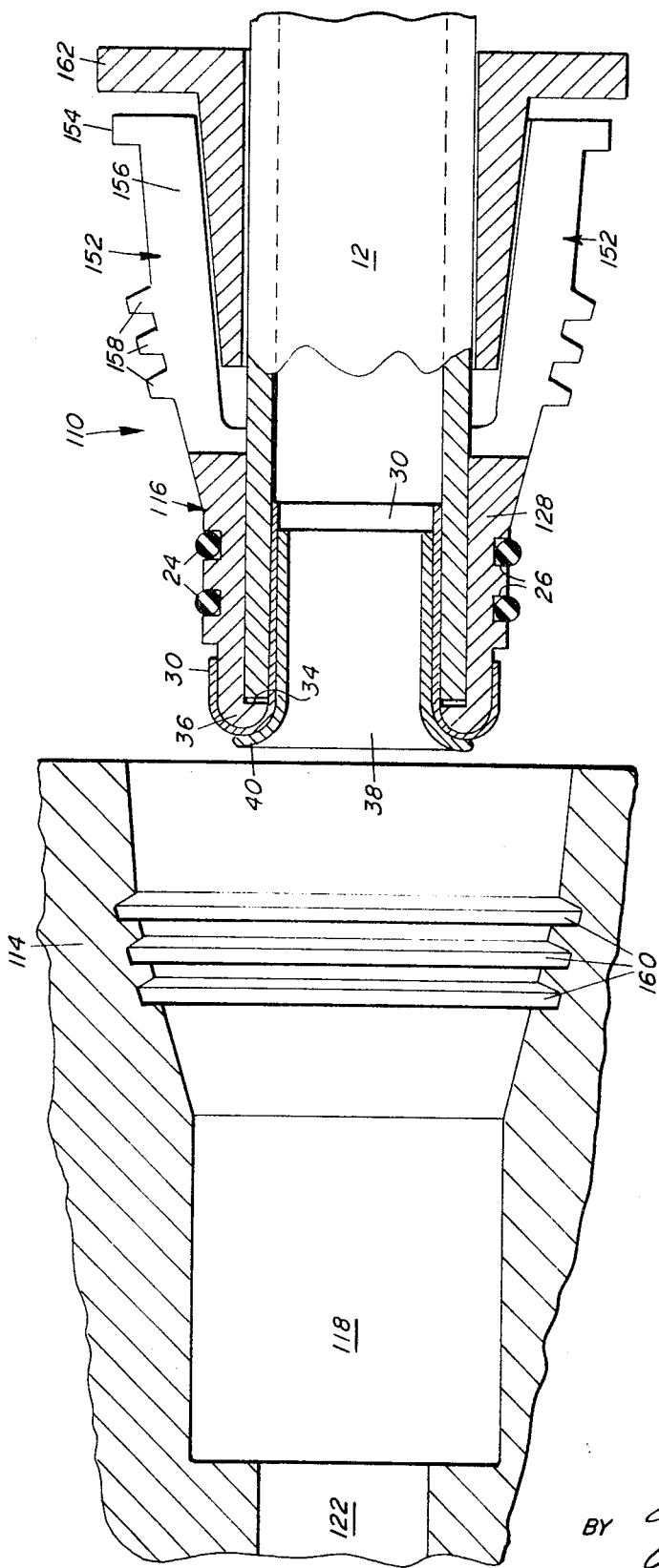

TUBE CONNECTOR FITTING

BACKGROUND OF THE INVENTION

In reverse osmosis applications, porous, membrane coated support tubes are coupled to a fluid distribution header. Periodic maintenance necessitates easy uncoupling of the tubes. High operating pressures, on the other hand, necessitate impervious fluid-tight sealing. To provide these features, this invention was made.

SUMMARY OF THE INVENTION

My invention is a connector fitting for coupling a hollow tube to a fluid distribution orifice with a fluid-tight seal. One application of the fitting is in connecting reverse osmosis tubes to a fluid distribution header. Other similar applications are equally foreseeable.

Basically my invention employs a male ferrule bonded to the exterior of a tubular conduit. On the outside of the ferrule one or more O-rings are positioned to engage the wall of a concentric female fitting, preventing external leaks. Folded over the end of the ferrule and extending into the interior of the tube, an elastomeric seal prevents interior leaks. The elastomeric seal is held firmly in place by a mechanically expanded metallic eyelet which extends from the edge of the ferrule into the tube.

Two distinct arrangements are employed to couple the fitting and header together. One employs a threaded nut that seals within a threaded bore in the header. The other employs a circular array of conical segments with interlocking ridges and grooves that snap flexibly together with a friction fit and are held by a locking wedge. Both arrangements enable easy removal while insuring a fluid tight seal with a minimum number of structural components.

Therefore, one object of my invention is a tube connector fitting with a minimum number of structural components.

Another object of my invention is a tube connector fitting with a threaded coupling design.

Another object of my invention is a tube connector fitting with a snap-in coupling design.

These and other objects of my invention are apparent in the following specification and drawing.

BRIEF DESCRIPTION OF THE DRAWING

FIG. 3 shows a tube connector fitting with a snap-in coupling design.

DESCRIPTION OF THE PREFERRED EMBODIMENT

Figure 1:
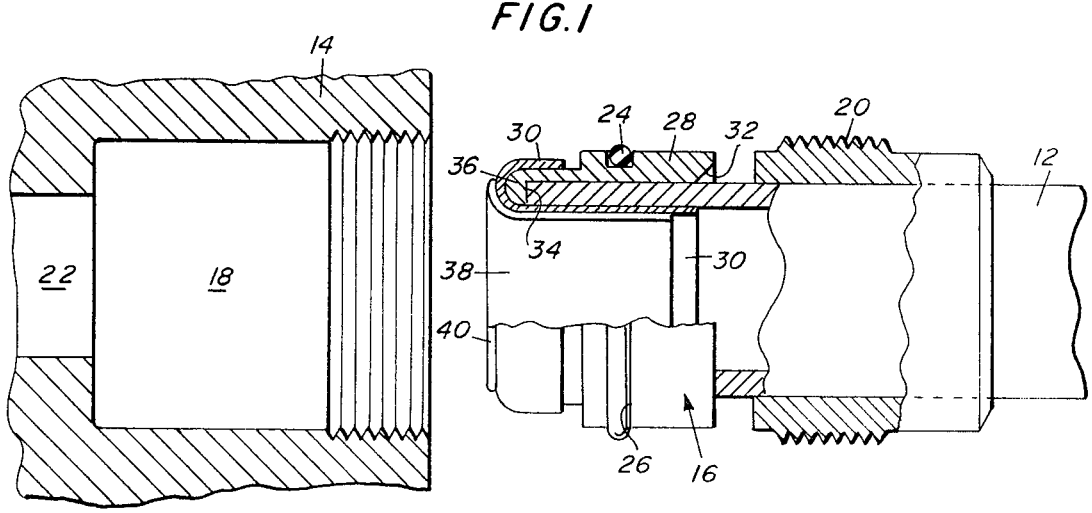
FIG. 1 shows a tube connector fitting with a threaded coupling design.
Figure 2:
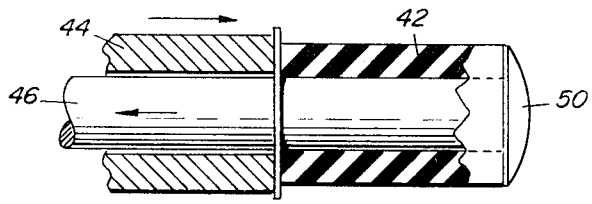
FIG. 2 shows a device for expanding a metallic eyelet shown in FIG. 1 and 3.

A tube connector fitting 10 for coupling a round, hollow tube 12 to a fluid distribution header 14 is shown in FIG. 1. To form a fluid-tight seal, a tubular body 16 is inserted within a close-fitting, concentric bore 18 in the fragmentarily shown header and fastened with a threaded nut 20. The nut slips freely on tube 12 to allow rotation into the threaded distal end of bore 18 without rotating the tube. In connected position, fluid flows through the tube and an opening 22 in the header.

As seen in the cut-away portion of FIG. 1, both external and internal seals on the tube body prevent fluid leakage past the assembled fitting. External leakage between the body 16 and bore 18 is prevented by a rubber O-ring 24 seated in a slot 26. The slot encircles a tubular ferrule 28 that forms the outer shell of body 16. Internal leakage between the ferrule and tube 30 is prevented by an elastomeric sleeve 30.

In assembling the fitting body 16 and tube 12, the tube is coated with epoxy glue (not shown) and inserted into a chamfered end 32 of ferrule 29. Alternatively, the ferrule is integrally molded around the tube. With porous tubular supports such as used in reverse osmosis applications, integral molding achieves more complete bonding than possible when the separate parts are glued. In assembled position the tube abuts a flat inner wall 34 of an inwardly extending shoulder 36 on the ferrule. The shoulder depth equals the tube wall thickness, forming a smooth transition between the inner surface of the tube and the rounded ferrule edge on the outside of the shoulder.

Near the shoulder the ferrule is somewhat smaller in diameter than the remaining body portion to provide clearance for the external portion of sleeve 30. With the tube and ferrule glued in the assembled position, a cylindrical elastomeric sleeve 30 is slipped over a metallic eyelet 38 so that both ends of the eyelet lie within the sleeve. The combined eyelet and sleeve, being only slightly smaller than the internal tube diameter, is lubricated with water and inserted into the tube until a curved flange 40 on one end of the eyelet abuts the rounded ferrule edge. To form a tight internal seal, the diameter of the eyelet is mechanically expanded to sandwich the elastomeric sleeve, tube, and ferrule together. For a leakproof seal, it is necessary that the resulting compression of the sleeve exceed the hydrostatic deformation caused by subsequent fluid operating pressure. To further seal the tube, the portion of the sleeve adjacent to the flanged eyelet end is folded back over the shoulder and onto the rounded end of the ferrule. In this stretched configuration the sleeve is drawn tightly against the ferrule, preventing internal fluid leaks.

One suitable method for expanding eyelet 38 employs a tubular elastomeric collet 42. By longitudinal compression the collet diameter is expanded to apply outward force to the eyelet. Compression is accomplished by oppositely directed motions (as shown by arrows) of a plunger 44 and concentric rod 46 which draw the collet between a washer 48 at one end a flange 50 on rod 46 at the other. By employing simultaneous opposed motions, the center of deformation of the metallic eyelet remains stationary and slippage is prevented. When used with membrane coated reverse osmosis tubes this method avoids longitudinal tension or compression damage to the delicate membrane structure.

After assembly, the fitting body 16 is secured within bore 18, as described above. The curved flange 40 on eyelet 38 protects the proximal portion of sleeve 30 from damage if the fitting contacts the bottom of the bore. When pressurized fluid is ultimately introduced, fluid pressure deforms each overlapped end of sleeve 30 against eyelet 38, providing additional fluidic resistance.

A second embodiment of a tube connector fitting 110 is shown in FIG. 3. This embodiment differs from the one previously described in the design for attachment to a header 114. For components which are the same in both embodiments the same numerals are used. For similar functioning components with different structures, FIG. 3 employs the same reference numeral preceded by the digit 1.

Figure 4:
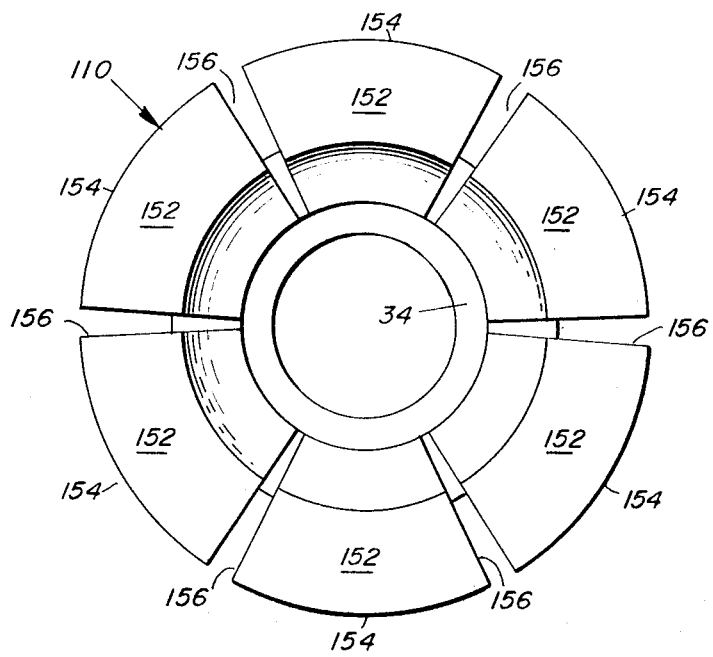
FIG. 4 is an end view of a portion of the fitting shown in FIG. 3.

In the embodiment of FIG. 3 a hollow tube 12 is joined to a tubular ferrule 128 in the manner described above. In this embodiment the ferrule, however, acts both as the tube retainer and as a means for attaching the fitting to fluid distribution header 114. Integrally connected at the rear of a body portion 116 is an outward tapering conical section 152, spaced from tube 12 and terminating with a flanged shoulder 154. As seen in FIG. 4, six radial slots 156 divide the conical section into six independent segments which are flexible toward and away from the tube. Along the outer surface of each segment, between body 116 and shoulder 154, lie three circumferentially oriented ridges 158.

In distribution header 114 a concentric bore 118 matches the outer dimensions of ferrule 128. Near the mouth of the bore, three concentric grooves 160 correspond to ridges 158 in the ferrule. When the fitting 110 is inserted into the bore, the segments flex inward toward tube 12 until ridges 158 align with grooves 160, at which point the segments flex outward into close fitting conformity with the bore. To lock the fitting in this position a cylindrical wedge 162, with a conical exterior conforming to the tapered inner walls of segments 152, is slipped over the tube and into the annular space within the ferrule. By making the angle of the inner wall less than the arc tangent of the coefficient of friction between the ferrule and wedge, the wedge is self-locking, tightly holding the fitting in locked position.

Suitable materials for the components described above will vary according to the particular application for which the fittings are employed. For coupling reverse osmosis membrane tubes in saline water conversion applications the following materials have been successfully employed: eyelet—cupro-nickel (90–10); ferrule—poly-carbonate plastic (20 percent glass); elastomeric seal —thin walled elastomer (0,010–"0.015") formed by extrusion from a Shell Chemical Polymer "Kraton," a block co-polymer of butadiene and styrene, or alternatively Neopreme or Buna N. For additional sealing of adjacent components, silicon pressure sensitive adhesives may be used, but are unnecessary if assembly is properly made.

While this invention is described by reference to specific preferred embodiments, modifications within the scope of this disclosure will be apparent to persons of ordinary skill in the art. For this reason the invention is limited only by the scope of the following claims.

I claim:

1. A tube connector fitting comprising:
   a tubular ferrule having a hollow inner bore and at least one exterior circumferential slot,
   a hollow, tubular conduit bonded concentrically within the hollow inner bore,
   a raised, resilient ring extending circumferentially around the ferrule and lying partially recessed within the circumferential slot,
   a resilient sleeve encircling the outer surface of the ferrule at one end, and continuing around the same end of the ferrule and into the tubular conduit,
   a ductile eyelet extending into the resilient sleeve within the tubular conduit and expanded outwardly to firmly bias the resilient seal against the tubular conduit, and
   means for securing the tubular ferrule within a close-fitting, concentrically mated bore.

2. A tube connector fitting as claimed in claim 1 in which:
   the portion of the tubular ferrule encircled by the resilient sleeve has a narrower diameter than the adjacent portion of the ferrule,
   the one end of the ferrule includes an inwardly projecting shoulder for abutting the end of the hollow conduit and forming a smooth transition between the surfaces of the ferrule and conduit, and
   the elastomeric sleeve extends into the conduit to a greater depth then the ductile eyelet.

3. A tube connector fitting as claimed in claim 2 in which:
   the ductile eyelet extends at least partially around the one end of the ferrule to sheild the elastomeric sleeve, and
   the resilient sleeve is an elastomeric material.

4. A tube connector fitting as claimed in claim 1 in which:
   the means for securing includes a nut concentrically supported for free sliding movement on the tubular conduit in abutting relationship with the end of the ferrule opposite the resilient sleeve.

5. A tube connector fitting as claimed in claim 2 in which:
   the means for securing includes a nut concentrically supported for free sliding movement on the tubular conduit in abutting relationship with the end of the ferrule opposite the resilient sleeve.

6. A tube connector fitting as claimed in claim 3 in which:
   the means for securing includes a nut concentrically supported for free sliding movement on the tubular conduit in abutting relationship with the end of the ferrule opposite the resilient sleeve.

7. A tube connector fitting as claimed in claim 1 in which:
   the means for securing includes a tapered conical sleeve integrally formed with the ferrule and divided by a plurality of radial slots into an array of flexible segments, each segment tapering outward from the conduit in spaced relationship and having at least one circumferential, outwardly extending ridge upon its outer surface, and
   a tapered conical wedge concentrically supported for free sliding movement on the tubular conduit and shaped for close fitting nesting abutment within the tapered conical sleeve.

8. A tube connector fitting as claimed in claim 2 in which:
   the means for securing includes a tapered conical sleeve integrally formed with the ferrule and divided by a plurality of radial slots into an array of flexible segments, each segment tapering outward from the conduit in spaced relationship and having at least one circumferential, outwardly extending ridge upon its outer surface, and
   a tapered conical wedge concentrically supported for free sliding movement on the tubular conduit and shaped for close fitting nesting abutment within the tapered conical sleeve.

9. A tube connector fitting as claimed in claim 3 in which:
   the means for securing includes a tapered conical sleeve integrally formed with the ferrule and divided by a plurality of radial slots into an array of flexible segments, each segment tapering outward from the conduit in spaced relationship and having at last one circumferential, outwardly extending ridge upon its outer surface, and
   a tapered conical wedge concentrically supported for free sliding movement on the tubular conduit and shaped for close fitting nesting abutment within the tapered conical sleeve.

10. A tube connector fitting comprising:
    a tubular ferrule having a hollow inner bore,
    a hollow, tubular conduit bonded concentrically within the hollow inner bore,
    means for resiliently sealing the tubular ferrule against a close-fitting concentrically mated bore,
    a tapered conical sleeve integrally formed with the ferrule and divided by a plurality of radial slots into an array of flexible segments, each segment tapering outward from the conduit in spaced relationship and having at least one circumferential, outwardly extending ridge upon its outer surface, and
    a tapered conical wedge concentrically supported for free sliding movement on the tubular conduit and shaped for close fitting nesting abutment within the tapered conical sleeve.

* * * * *